Dec. 29, 1964   M. I. BRENNER   3,163,260
RETARDER MECHANISM FOR CONVEYOR SYSTEMS
Filed April 26, 1960
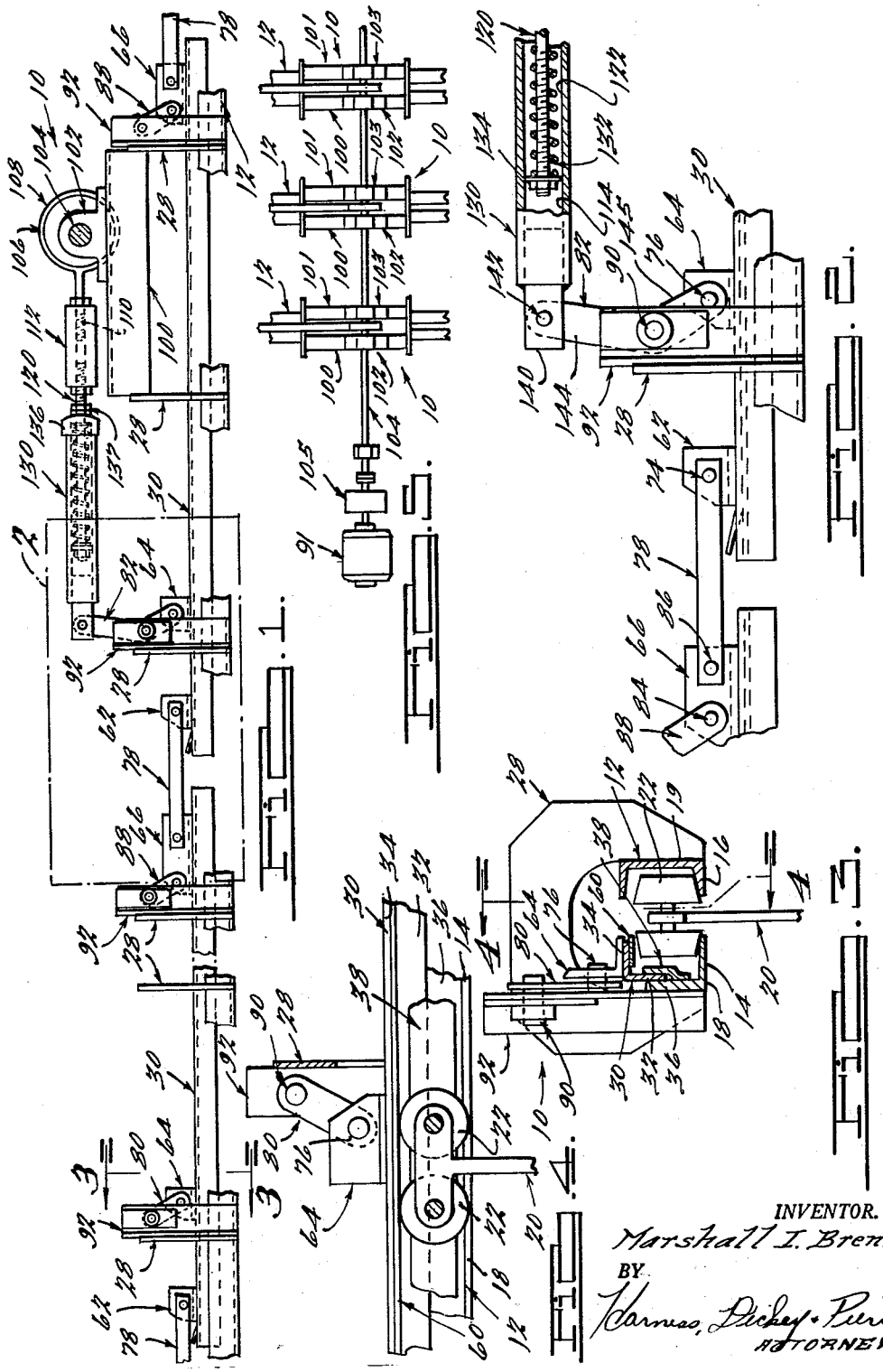
INVENTOR.
Marshall I. Brenner
BY
Barnes, Dickey & Pierce
ATTORNEYS.

United States Patent Office 3,163,260
Patented Dec. 29, 1964

3,163,260
RETARDER MECHANISM FOR CONVEYOR SYSTEMS
Marshall I. Brenner, Detroit, Mich., assignor to Anchor Steel and Conveyor Company, Dearborn, Mich., a corporation of Michigan
Filed Apr. 26, 1960, Ser. No. 24,712
7 Claims. (Cl. 188—35)

This invention relates generally to conveyor systems, and more particularly to a retarder mechanism for a gravity fed conveyor system.

Conveyor systems are often employed to transport articles between work stations on a production line, or when it is required that articles be stored between work stations or upon completion thereof, to storage or shipping facilities. Often, such conveyor systems comprise, in addition to the conventional power driven section that is driven at a relatively constant speed by one or more prime movers, a plurality of gravity fed storage sections onto which the articles are shunted for storage. In, for example, an overhead conveyor system, the trolleys thereof may be switched from the power driven section onto a gravity fed storage line that is inclined at, for example, ¼" to the foot, the trolleys thereafter moving by gravity to the end of the storage line. Such storage lines are often relatively long, for example, 200' or more and, in the absence of a retarder mechanism, the trolleys are free to accelerate therealong until they impact against a stop or the next precedent trolley subjecting the trolley and the articles carried thereby to damage due to sudden stoppage.

Therefore, the problem presented, to which a retarder mechanism in accordance with the present invention presents a novel solution, is the problem of controlling the velocity of the trolleys as they transverse an inclined conveyor system under the influence of gravity.

Another requirement of such a gravity fed conveyor system, which in effect is the antithesis of the aforementioned requirement of a retarder mechanism, is established by the practice of unloading the trolleys in succession from the lower end of each storage line, it therefore being necessary that each of the trolleys advance in the line as the terminal carrier is removed therefrom. Movement of the trolleys must be sufficiently free so that starting friction of the trolley with respect to the track is easily overcome by the force of gravity.

Therefore, in order to satisfy both of the aforementioned seemingly incompatible requirements, a retarder mechanism must provide for intermittent free movement of the articles or trolleys along the storage line under the force of gravity, as well as control the velocity thereof, after initial acceleration.

One conventional method of retarding forward movement of the trolleys of an overhead conveyor system is to provide a plurality of drag arms spaced intermittently along the storage line to engage each trolley and thereby exert a frictional drag thereupon as the trolley moves past the arm. Such retarding mechanisms are not entirely satisfactory in that in actual practice the loads carried by the trolleys vary considerably. A heavily loaded trolley may pass the drag arm without being material decelerated. On the other hand, a lightly loaded trolley may not have sufficient inertia to pass beyond the drag arm. Also, if a trolley happens to stop in contact with the drag arm the gravitational force tending to move the trolley may not be sufficient to overcome both the starting friction of the trolley and the holding friction of the drag arm.

The retarder mechanism of the present invention intermittently retards and releases the trolleys of a conveyor system thereby to control acceleration thereof. This concept is embodied in a retarder mechanism that preferably extends the entire length of the gravity fed section of a conveyor system and comprises a plurality of brake shoes that are connected for concomitant operation so as to be intermittently engageable with the trolleys to control the velocity thereof. The retarder mechanism has a plurality of adjustments that provide for positive control over the braking forces irrespective of load or the location of the trolleys on the gravity fed storage line. When paralleled gravity fed conveyor lines are utilized, the retarder mechanisms thereof can be energized by a common power source.

Accordingly, one object of the present invention is an improved retarder mechanism for a conveyor system.

Another object is a retarder mechanism that is intermittently engaged and released to effect positive control of the velocity of an article moving along the conveyor system.

Another object is an intermittently operable retarder mechanism having provision for adjustment of the frequency of engagement thereof with an article supported for movement by the conveyor system.

Another object is a retarder mechanism that is easily adjustable with respect to the engaging bias thereof on an article carried by the conveyor system.

Another object is a retarder mechanism that is compatible with conventional conveyor systems.

Another object is a retarder mechanism having a plurality of brake shoes extending substantially the entire length of the conveyor system.

Another object is a retarder mechanism for a conveyor system that is easily paralleled with similar retarder mechanisms on aligned gravity fed conveyors.

Other objects and advantages of the present invention will become apparent from a study of the following specification wherein reference is made to the drawings in which:

FIGURE 1 is a fragmentary side elevational view of a retarder mechanism shown in operative association with an overhead conveyor system;

FIG. 2 is a fragmentary view of the portion designated "2" of FIGURE 1 enlarged for clarity;

FIG. 3 is a cross-section view taken substantially along the line 3—3 of FIG. 1;

FIG. 4 is a cross-section view taken substantially along the line 4—4 of FIG. 3; and FIG. 5 is a top-plan view of a plurality of retarder mechanisms operatively associated with a like plurality of overhead conveyors, the retarder mechanisms being energized by a common power source.

A retarder mechanism 10, in accordance with an exemplary embodiment of the present invention, is shown in operative association with a conventional track 12 of an overhead conveyor system. The track 12 is formed by two opposed flanges 14 and 16 on an L-shaped beam 18 and a U-shaped channel 19, respectively, that are spaced to accommodate a trolley 20 therebetween. The opposed horizontally extending flanges 14 and 16 on the beam 18 and channel 19, respectively, support a plurality of suitably spaced wheels 22 of the trolley 20. The beam 18 and channel 19 are supported at spaced intervals by suitable hangers 28 that are suspended as by suitable rods (not shown) from the superstructure of an enclosure.

Each of the retarder mechanisms 10 is similar in construction, therefore, for the purpose of clarity, only one will be described hereinafter. Also, because each retarder mechanism 10 comprises a plurality of longitudinally aligned and interconnected brake sections of similar construction, only one brake section will be described, like numbers being applied to like elements of each brake section.

Each brake section of each retarder mechanism 10 comprises an elongated brake shoe 30 of L-shaped cross-section defined by a downwardly depending flange 32 and a horizontal flange 34. The shoe 30 is guided for longitudinal and vertical movement with respect to the track 12 by slidable engagement of the flange 32 thereof between a vertical flange 36 on the L-shaped beam 18 and a guide flange 38 that is secured to the inner face of the flange 36 on the beam 18, as by welding.

A brake lining 60 of suitable material, for example, cloth reinforced asbestos, is affixed to the horizontal flange 34 of the brake shoe 30 as by cementing.

Each brake shoe 30 has a plurality of L-shaped hangers 62, 64 and 66 affixed to the upper side of the flange 34 thereof, as by welding. The hangers 62 and 64 have support pins 74 and 76 extending therethrough for the support of ene end of a tie bar 78 and and front pivot arm 80 or bellcrank 82, respectively. The bellcrank 82 replaces one of the front pivot arms 80 on one of the brake sections to effect movement of the retarder mechanism 10, as will be described. The hanger 66 has a pair of transversely extending pins 84 and 86 for pivotal support of a rear pivot arm 88 and the other end of the tie bar 78, respectively.

The pivot arms 80 and 88 and bellcrank 82 are pivotally supported on pins 90 that extend transversely of a like number of upstanding pivot arm support brackets 92. The arm support brackets 92 are secured to appropriate ones of the track hangers 28, as by welding.

One of the brake shoes 30 is mechanically connected to a variable speed electric motor 91 (FIG. 5), in a manner to be described, to effect concomitant movement of the plurality of aligned and interconnected brake shoes 30 that comprise each retarder mechanism 10.

A pair of spaced bearing support brackets 100 and 101 are secured to and extend between spaced ones of the hangers 28. A pair of bearings 102 and 103 are supported on the brackets 100 and 101, respectively, so as to journal a transversely extending drive shaft 104. The drive 104 is connected to the electric motor 91 through a suitable speed reducer 105.

A circular cam 106 is eccentrically mounted on the drive shaft to effect reciprocation of a connecting rod 108 that is rotatably connected about the eccentric cam 106. An end portion 110 of the connecting rod 108 is threadably engaged with one end of a tubular coupling 112, relative rotation therebetween varying the additive length of the coupling 112 and connecting rod 108. A threaded rod 120 is engaged with the opposite end of the tubular coupling 112 and extends into a central bore 114 in a tubular member 130. The rod 120 is connected to the member 130 by a helical coil spring 132 that extends between a nut 134 on the rod 120 and one side of a transverse collar 136 on the end of the tubular member 130. A nut 137 is threadably engaged with the rod 120 and with the other side of the collar 136. Therefore axial movement of the rod 120 to the left, as seen in the drawings, is transmitted to the member 130 by the nut 137. Axial movement of the rod 120 to the right is transmitted to the member 130 through the spring 132.

An end plug 140 on the tube 130 has a transverse pin 142 extending therethrough for the pivotal support of an upper end portion 144 of the downwardly extending bellcrank 82. The bellcrank 82 is pivoted on an appropriate one of the transversely extending pivot pins 90 that are supported by the upstanding brackets 92. The bellcrank has a downwardly depending portion 145 for connection to the drive pin 76 on the brake shoe 30.

Rotation of the drive shaft 104 and eccentric cam 106 effects reciprocation of the connecting rod 108, thereby rotating the bellcrank 82 about its pivot 90 with an oscillating motion. Oscillation of the bellcrank 82 is transmitted to the brake shoe 30 through the drive pin 76 thereby moving the brake shoe 30 in translation upwardly and to the right, as seen in the drawing, with respect to the track 12 as the connecting rod 108 moves to the left. As the connecting rod 108 moves to the right, the brake shoe 30 moves downwardly and to the left, whereupon the brake lining 60 thereon engages the wheels 22 of the trolley 20.

It is to be noted that the extensibility of the connecting rod 108 provides for the initial positioning of the brake shoe 30 with respect to the track 12, and is so adjusted that the brake shoe 30 completely clears the wheels 22 of the trolley 20 when driven to the upper position. Thereafter the lost motion linkage through the spring 132 provides for controlled frictional engagement between the brake 30 and the trolley 20. The braking effect of the oscillating brake shoe 30 on the trolley 20 can be controlled by either varying the additive length of the coupling 112 and connecting rod 108, by increasing the pressure of the brake shoe 30 on the trolley 20 by changing the initial bias of the spring 132 or by varying the rotational speed of the drive shaft 104 thereby to vary the number of contacts per minute of the brake shoe 30 with the trolley 20. The first two of the aforementioned adjustments are mutually interdependent, the latter adjustment being independent of the others. In this manner the retarding effect of the mechanism 10 can be both initially adjusted to meet an anticipated condition and controlled while in operation by varying the speed of the motor 90.

Referring to FIGURE 5, paralleled gravity fed tracks 12 are provided with like retarder mechanisms 10 that are energized by a common motor 91 through a common drive shaft 104. In this manner, an entire gravity fed conveyor system can be controlled by effecting control of a single prime mover for the retarder mechanism 10.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a gravity fed conveyor system including a track with a wheeled trolley thereon, a retarder mechanism for controlling the velocity of movement of the trolley along the track comprising a brake shoe pivotally supported at two spaced points for movement in translation toward and away from said track and frictionally engageable with the trolley upon movement toward the track, a bellcrank supported for rotation by said track and pivotally engaged with said brake shoe and a free end of a connecting rod, a cam journaled in the other end of said connecting rod, and a drive shaft extending eccentrically through said cam whereby rotation of said drive shaft effects reciprocation of said connecting rod, bellcrank and brake shoe thereby to effect intermittent engagement and disengagement of said brake shoe with said trolley.

2. In a gravity fed conveyor system including a track with a wheeled trolley thereon, a retarder mechanism for controlling the velocity of movement of the trolley along the track comprising a brake shoe pivotally supported at two spaced points for movement in translation toward and away from said track and frictionally engageable with the trolley upon movement toward the track, a bellcrank supported for rotation by said track and pivotally engaged with said brake shoe and an extensible connecting rod, a cam for driving said connecting rod, and a drive shaft extending eccentrically through said cam whereby rotation of said drive shaft effects reciprocation of said connecting rod, bellcrank and brake shoe thereby to effect intermittent engagement and disengagement of said brake shoe with said trolley.

3. In a gravity fed conveyor system including a track with a wheeled trolley thereon, a retarder mechanism for controlling the velocity of movement of the trolley along the track comprising a brake shoe pivotally supported at two spaced points for movement in translation toward and away from said track and frictionally engageable with the trolley upon movement toward the track, a bellcrank supported for rotation by said track and pivotally engaged with said brake shoe, resilient means connecting said bellcrank and connecting rod, a cam for driving said connecting rod, and a drive shaft extending eccentrically through said cam whereby rotation of said drive shaft effects reciprocation of said connecting rod, bellcrank and brake shoe thereby to effect intermittent engagement and disengagement of said brake shoe with said trolley.

4. In a gravity fed conveyor system including a track with a wheeled trolley thereon, a retarder mechanism for controlling the velocity of movement of the trolley along the track comprising a brake shoe pivotally supported at two spaced points for movement in translation toward and away from said track and frictionally engageable with the trolley upon movement toward the track, a flange on said brake shoe slidably engageable with said track to guide relative movement therebetween, a bellcrank supported for rotation by said track and pivotally engaged with said brake shoe and one end of a lost motion linkage, resilient means connecting the other end of said linkage with one end of a connecting rod, and compressible upon movement of said connecting rod in one direction, rigid means on said connecting rod engageable with said linkage to positively drive said linkage upon movement of said connecting rod in the other direction, a cam journaled in the other end of said connecting rod, a drive shaft extending eccentrically through said cam, and a variable speed prime mover for effecting rotation of said drive shaft whereby rotation of said drive shaft effects reciprocation of said connecting rod, bellcrank and brake shoe thereby to effect intermittent engagement and disengagement of said brake shoe with said trolley.

5. In a gravity fed conveyor system including an elongated inclined track and a trolley continuously movable along the track, a retarder mechanism for controlling the velocity of movement of the trolley along the track comprising a brake shoe, means normally supporting said brake shoe in spaced relation to said track and trolley for moving said shoe into frictional engagement with said trolley, and an electric motor connected to said means operable to effect movement of said brake shoe into and out of engagement with said trolley in a predetermined continuing sequence thereby to alternately slow the continuous movement of said trolley then release said trolley for movement due to gravity.

6. A gravity fed conveyor system in accordance with claim 5 wherein said supporting means includes means for regulating the pressure exerted by said brake shoe against said trolley.

7. A gravity fed conveyor system in accordance with claim 5 wherein the speed of said electric motor is variable so as to vary the time lapse between successive engagements of said brake shoe with said trolley.

References Cited in the file of this patent
UNITED STATES PATENTS

| | | |
|---|---|---|
| 328,360 | Teague | Oct. 13, 1885 |
| 683,370 | Acklin | Sept. 24, 1901 |
| 791,091 | Gamalielson | May 30, 1905 |
| 1,386,496 | Hassler | Aug. 2, 1921 |
| 1,522,299 | Hampton | Jan. 6, 1925 |
| 1,580,584 | Church et al. | Apr. 13, 1926 |
| 1,730,519 | McKee | Oct. 8, 1929 |
| 2,744,472 | Symons | May 8, 1956 |
| 2,754,767 | Fill et al. | July 17, 1956 |
| 2,832,297 | Daniels | Apr. 29, 1958 |

FOREIGN PATENTS

| | | |
|---|---|---|
| 580,096 | Canada | July 21, 1959 |